(12) United States Patent
Stone et al.

(10) Patent No.: US 11,485,864 B2
(45) Date of Patent: Nov. 1, 2022

(54) ELECTRODEPOSITABLE COATING COMPOSITION HAVING IMPROVED CRATER CONTROL

(71) Applicant: PPG Industries Ohio, Inc., Cleveland, OH (US)

(72) Inventors: David A. Stone, Allison Park, PA (US); Egle Puodziukynaite, Allison Park, PA (US); Marissa E. McGovern, Valencia, PA (US); Craig A. Wilson, Allison Park, PA (US); Alycia Lewand, Irwin, PA (US); Jo-Ann E. Bice, Cranberry Township, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 427 days.

(21) Appl. No.: 16/801,209

(22) Filed: Feb. 26, 2020

(65) Prior Publication Data
US 2021/0261799 A1    Aug. 26, 2021

(51) Int. Cl.
*C09D 5/44* (2006.01)
*C09D 175/14* (2006.01)
*C25D 13/04* (2006.01)

(52) U.S. Cl.
CPC ........... *C09D 5/4473* (2013.01); *C09D 5/448* (2013.01); *C09D 5/4492* (2013.01); *C09D 5/4496* (2013.01); *C09D 175/14* (2013.01); *C25D 13/04* (2013.01)

(58) Field of Classification Search
None
See application file for complete search history.

(56) References Cited

U.S. PATENT DOCUMENTS

| | | |
|---|---|---|
| 5,919,856 A | 7/1999 | Nishi et al. |
| 8,884,059 B2 | 11/2014 | Zawacky et al. |
| 9,850,329 B2 | 12/2017 | Yoo et al. |
| 9,994,669 B2 | 6/2018 | Tian et al. |
| 10,329,437 B2 | 6/2019 | Kaylo et al. |
| 2007/0249778 A1 | 10/2007 | Clemens et al. |
| 2014/0050869 A1 | 2/2014 | Most et al. |
| 2016/0376386 A1 | 12/2016 | Yoo et al. |
| 2018/0100081 A1 | 4/2018 | Parker |
| 2018/0282557 A1 | 10/2018 | Gam et al. |
| 2019/0016847 A1 * | 1/2019 | Henning ............... C08F 136/22 |
| 2021/0155745 A1 * | 5/2021 | Chao .................... C08F 136/22 |

FOREIGN PATENT DOCUMENTS

| | | |
|---|---|---|
| EP | 0255727 | 2/1988 |
| EP | 3037467 A1 | 6/2016 |
| JP | H1011025 A | 4/1998 |
| JP | 2002356645 A | 12/2002 |
| JP | 2008111125 | 5/2008 |
| WO | 0064990 A1 | 11/2000 |
| WO | 2017065864 A2 | 4/2017 |
| WO | 2018005887 A1 | 1/2018 |

* cited by examiner

*Primary Examiner* — Louis J Rufo
(74) *Attorney, Agent, or Firm* — Charles M. Yeomans

(57) ABSTRACT

The present invention is directed towards an electrodepositable coating composition comprising a polyfarnesene polymer and an ionic salt group-containing film-forming polymer. Also disclosed are methods of coating a substrate using the electrodepositable coating composition, coatings derived from the electrodepositable coating composition, and substrates coated with the coatings derived from the electrodepositable coating composition.

18 Claims, No Drawings

ELECTRODEPOSITABLE COATING COMPOSITION HAVING IMPROVED CRATER CONTROL

FIELD OF THE INVENTION

The present invention is directed towards an electrodepositable coating composition, coatings derived therefrom, and methods of applying such coatings.

BACKGROUND INFORMATION

Oil contamination on substrate surfaces is problematic for electrodepositable coating compositions. Oil deposits, such as oils used in automotive assembly lines, result in the formation of defects in the cured coating in the form of craters. These craters form when the electrodepositable coating composition de-wets from the area around where the oil was deposited and the coating may cure around the oil deposit. The formation of craters affects both the smoothness and appearance of the cured coating and requires extra processing steps, such as sanding, to achieve the desired coating finish. Electrodepositable coating composition having reduced or eliminated craters are desired.

SUMMARY OF THE INVENTION

Disclosed is an electrodepositable coating composition comprising a polyfarnesene polymer; and an ionic salt group-containing film-forming polymer.

The present invention also discloses a method of coating a substrate comprising electrophoretically applying a coating deposited from an electrodepositable coating composition comprising a polyfarnesene polymer and an ionic salt group-containing film-forming polymer to at least a portion of the substrate.

The present invention further discloses a substrate coated with a coating deposited from an electrodepositable coating composition comprising a polyfarnesene polymer and an ionic salt group-containing film-forming polymer.

DETAILED DESCRIPTION OF THE INVENTION

The present invention is directed to electrodepositable coating composition comprising, consisting essentially of, or consisting of a polyfarnesene polymer and an ionic salt group-containing film-forming polymer.

As used herein, the term "electrodepositable coating composition" refers to a composition that is capable of being deposited onto an electrically conductive substrate under the influence of an applied electrical potential.

As used herein, the term "polyfarnesene polymer" refers to a polymer comprising more than one constitutional unit comprising the residue of a farnesene monomer. Other non-farnesene monomers may be used in combination with farnesene monomers in forming the polyfarnesene polymer.

As used herein, the term "farnesene" refers to a set of six related sesquiterpenes that include the isomers α-farnesene (3,7,11-trimethyl-1,3,6,10-dodecatetraene) and β-farnesene (7,11-dimethyl-3-methylene-1,6,10-dodecatriene) which differ in the placement of a double bond, and their stereoisomers of which α-farnesene has four and β-farnesene has two. For example, the term farnesene includes (E,E)-α-farnesene depicted as structure (i), (E,Z)-α-farnesene depicted as structure (ii), (Z,E)-α-farnesene depicted as structure (iii), (Z,Z)-α-farnesene depicted as structure (iv), trans-β-farnesene depicted as structure (v), and cis-β-farnesene depicted as structure (vi), each depicted below.

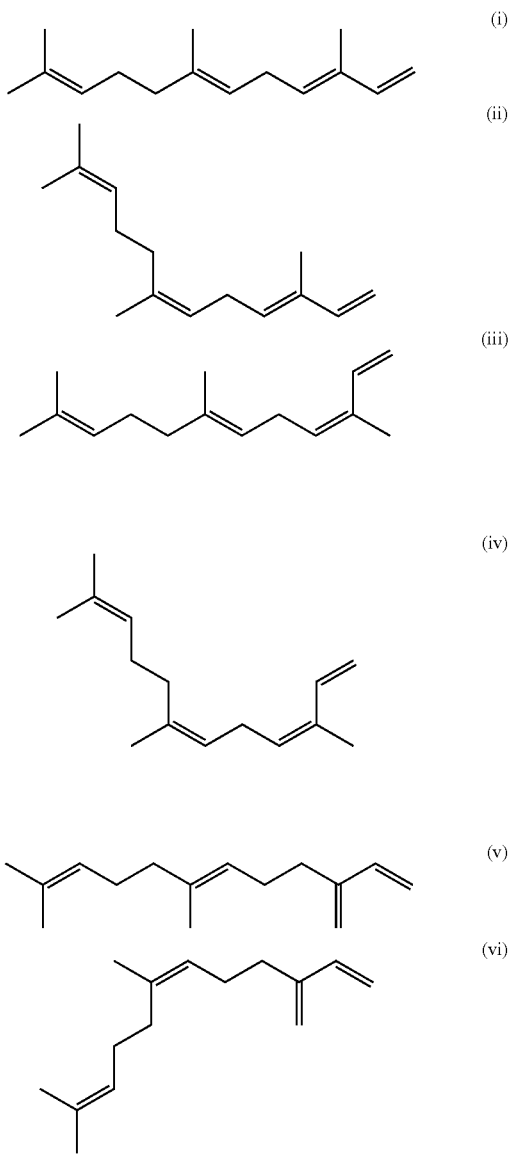

The polyfarnesene polymer comprises constitutional units comprising the residue of a farnesene monomer including the residue of any of the farnesene isomers or stereoisomers depicted as structure (i) through (vi) above. For example, the constitutional units comprising the residue of a farnesene monomer may comprise a constitutional unit comprising the residue of (E,E)-α-farnesene depicted as structure (I), a constitutional unit comprising the residue of (E,Z)-α-farnesene depicted as structure (II), a constitutional unit comprising the residue of (Z,E)-α-farnesene depicted as structure (III), a constitutional unit comprising the residue of (Z,Z)-α-farnesene depicted as structure (IV), a constitutional unit comprising the residue of trans-β-farnesene depicted as structure (V), a constitutional unit comprising the residue of cis-β-farnesene depicted as structure (VI), as well as any combination thereof, each of which is depicted below.

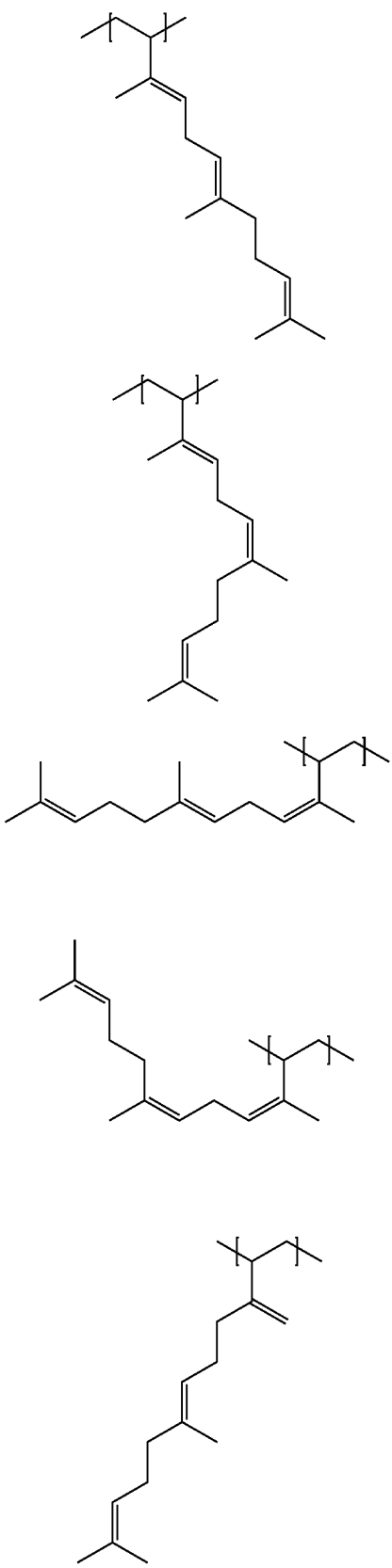

The polyfarnesene polymer may comprise constitutional units comprising the residue of a farnesene monomer in an amount of at least 1% by weight, such as at least 20% by weight, such as at least 50% by weight, such as at least 65% by weight, such as at least 75% by weight, such as at least 85% by weight, such as 90% by weight, such as at least 95% by weight, such as at least 99% by weight, such as 100% by weight, based on the total weight of the polyfarnesene polymer. The polyfarnesene polymer may comprise constitutional units comprising the residue of a farnesene monomer in an amount of no more than 100% by weight, such as no more than 95% by weight, such as no more than 90% by weight, based on the total weight of the polyfarnesene polymer. The farnesene monomer may comprise any farnesene monomer, such as, for example, α-farnesene, β-farnesene, any stereoisomers thereof, and any combination thereof. For example, the polyfarnesene polymer may comprise, consist essentially of, or consist of constitutional units comprising the residue of (E,E)-α-farnesene depicted, (E,Z)-α-farnesene, (Z,E)-α-farnesene, (Z,Z)-α-farnesene, trans-β-farnesene, cis-β-farnesene, or any combination thereof. In another example, the polyfarnesene polymer may comprise, consist essentially of, or consist of constitutional units comprising the residue of trans-β-farnesene. For example, the polyfarnesene polymer may comprise constitutional units comprising the residue of a farnesene monomer in an amount of 1% to 100% by weight, such as 20% to 100% by weight, such as 50% to 100% by weight, such as 65% to 100% by weight, such as 75% to 100% by weight, such as 85% to 100% by weight, such as 90% to 100% by weight, such as 95% to 100% by weight, such as 99% to 100% by weight, such as 1% to 95% by weight, such as 20% to 95% by weight, such as 50% to 95% by weight, such as 65% to 95% by weight, such as 75% to 95% by weight, such as 85% to 95% by weight, such as 90% to 95% by weight, such as 1% to 90% by weight, such as 20% to 90% by weight, such as 50% to 90% by weight, such as 65% to 90% by weight, such as 75% to 90% by weight, such as 85% to 90% by weight, based on the total weight of the polyfarnesene polymer.

The polyfarnesene polymer optionally may comprise constitutional units comprising the residue of other unsaturated monomers different from farnesene. For example, the polyfarnesene polymer may optionally comprise constitutional units comprising the residue of butadiene, isoprene, styrene, sesquiterpenes, such as, for example, the three isomers of bisabolene (α-, β-, and γ-bisabolene), and the like, as well as any combination thereof. When present, such constitutional units comprising the residue of an unsaturated monomer different than farnesene may be present in an amount of at least 1% by weight, such as at least 5% by weight, such as at least 10% by weight, such as at least 20% by weight, such as at least 30% by weight, based on the total weight of the polyfarnesene polymer. When present, such constitutional units comprising the residue of an unsaturated monomer different than farnesene may be present in an amount of no more than 99% by weight, such as no more than 50% by weight, such as no more than 40% by weight, such as no more than 30% by weight, such as no more than 10% by weight, such as no more than 5% by weight, such as no more than 1% by weight, based on the total weight of the polyfarnesene polymer. When present, such constitutional units comprising the residue of an unsaturated monomer different than farnesene may be present in an amount of 1% to 99% by weight, such as 5% to 50% by weight, such as 10% to 40% by weight, such as 20% to 30% by weight, such as 1% to 50% by weight, such as 1% to 40% by weight, such as 1% to 30% by weight, such as 1% to 10% by weight, based on the total weight of the polyfarnesene polymer.

The polyfarnesene polymer may optionally comprise one or more functional groups. For example, the polyfarnesene polymer may comprise hydroxyl functional groups, amino functional groups, thiol functional groups, epoxide functional groups, amide functional groups, carbamate functional groups, carboxylic acid groups, phosphorous acid groups (such as phosphoric acid and phosphonic acid), sulfonic acid groups, or any combination thereof. The polyfarnesene polymer may be mono-functional and have an average of one functional group per molecule, di-functional and have an average of two functional group per molecule, tri-functional and have an average of three functional group per molecule, tetra-functional and have an average of four functional group per molecule, or higher numbers of functional groups.

The polyfarnesene polymer may comprise a polyfarnesene polyol. As employed herein, the term "polyol" or variations thereof refers broadly to a material having an average of two or more hydroxyl groups per molecule. Accordingly, the polyfarnesene polyol comprises at least two hydroxyl functional groups, such as at least 3 hydroxyl functional groups, such as at least 4 hydroxyl functional groups, or more. For example, the polyfarnesene polyol may comprise about 2, about 3, about 4, or more hydroxyl functional groups. The hydroxyl functional groups of the polyfarnesene polyol may comprise primary, secondary or tertiary hydroxyl functional groups, or any combination thereof. For example, the polyfarnesene polyol may comprise a polyfarnesene diol having primary and/or secondary hydroxyl functional groups, and the polyfarnesene diol may be according to the following general structure:

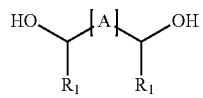

wherein [A] comprises a polymeric chain comprising one or more constitutional units comprising the residue of a farnesene monomer according to the structures (I) to (VI) above and may optionally comprise constitutional units of the residue of other unsaturated monomers different from farnesene, and each $R_1$ independently comprises hydrogen or methyl.

The polyfarnesene polyol may have a theoretical hydroxyl group equivalent weight of at least 100 g/equivalent, such as at least 500 g/equivalent, such as at least 750 g/equivalent, such as at least 1,000 g/equivalent, such as at least 1,300 g/equivalent. The polyfarnesene polyol may have a theoretical hydroxyl group equivalent weight of no more than 10,000 g/equivalent, such as no more than 7,000 g/equivalent, such as no more than 5,000 g/equivalent, such as no more than 3,000 g/equivalent, such as no more than 2,000 g/equivalent, such as no more than 1,700 g/equivalent. The polyfarnesene polyol may have a theoretical hydroxyl group equivalent weight of 100 to 10,000 g/equivalent, such as 500 to 7,000 g/equivalent, such as 750 to 5,000 g/equivalent, such as 1,000 to 3,000 g/equivalent, such as 1,300 to 2,000 g/equivalent, such as 1,300 to 1,700 g/equivalent. The theoretical hydroxyl equivalent weight may be determined by dividing the number average molecular weight of the polyfarnesene polyol by the theoretical number of hydroxyl groups per molecule of polymer. The theoretical hydroxyl equivalent weight may also be determined by dividing the total grams of monomers used to make the polyfarnesene polyol by the total theoretical hydroxyl equivalents included in making the polyfarnesene polyol.

The hydroxyl equivalent of the polyfarnesene polyol may be at least 0.1 meq/g, such as at least 0.3 meq/g, such as at least 0.4 meq/g, such as at least 0.5 meq/g, such as at least 0.6 meq/g. The hydroxyl equivalent of the polyfarnesene polyol may be no more than 2.0 meq/g, such as no more than 1.5 meq/g, such as no more than 1.1 meq/g, such as no more than 0.9 meq/g, such as no more than 0.7 meq/g. The hydroxyl equivalent of the polyfarnesene polyol may be from 0.1 to 2.0 meq/g, such as 0.3 to 1.5 meq/g, such as 0.4 to 1.1 meq/g, such as 0.5 to 0.9 meq/g, such as 0.6 to 0.7 meq/g.

The number average molecular weight of the polyfarnesene polymer may be at least 500 g/mol, such as at least 1,800 g/mol, such as at least 2,100 g/mol, such as at least 2,500 g/mol, such as at least 2,800 g/mol. The number average molecular weight of the polyfarnesene polymer may be no more than 10,000 g/mol, such as no more than 5,000 g/mol, such as no more than 4,000 g/mol, such as no more than 3,500 g/mol, such as no more than 3,200 g/mol. The number average molecular weight of the polyfarnesene polymer may be from 500 g/mol to 10,000 g/mol, such as 1,800 g/mol to 5,000 g/mol, such as 2,100 g/mol to 4,000 g/mol, such as 2,500 g/mol to 3,500 g/mol, such as 2,800 g/mol to 3,200 g/mol.

As used herein, the term "number average molecular weight" or "($M_n$)" means the number average molecular weight ($M_n$) as determined by gel permeation chromatography (GPC) using polystyrene standards for calibration. The GPC determination can be performed using a Waters 2695 separation module with a Waters 410 differential refractometer (RI detector), linear polystyrene standards having molecular weights of from 580 Da to 365,000 Da, dimethylformamide (DMF) with 0.05M lithium bromide (LiBr) as the eluent at a flow rate of 0.5 mL/min, and one Shodex Asahipak GF-510 HQ column (300×7.5 mm, 5 μm) for separation.

As stated above, the polyfarnesene polymer may be in the form of an additive that is added to an electrodepositable coating composition. According to the present invention, the additive may be added "neat", that is, added directly into the electrodepositable coating composition without prior blending or reacting with the other components that comprise the electrodepositable coating composition. For example, the additive may be added "neat" into an electrodeposition bath and/or to components that are used to form the electrodeposition bath (e.g., resin blend and/or pigment paste). According to the present invention, the additive may be added to an aqueous medium prior to the aqueous medium being added to the electrodeposition bath. For instance, the additive may be added to an aqueous medium, which is added to the electrodeposition bath after the electrodeposition bath has been prepared (i.e., post added). According to the present invention, the additive may be added "neat" into the resin blend and/or into the pigment paste before the resin blend and/or the pigment paste is dispersed in an aqueous medium. In other words, the additive may be added to the resin blend and/or to the pigment paste prior to the formation of the electrodeposition bath.

The polyfarnesene polymer may be present in the electrodepositable coating composition in an amount of at least 0.1% by weight, such as at least 0.5% by weight, such as at least 0.75% by weight, based on the total weight of the resin blend solids. The polyfarnesene polymer may be present in the electrodepositable coating composition in an amount of no more than 10% by weight, such as no more than 4% by weight, such as no more than 3% by weight, based on the total weight of the resin blend solids. The polyfarnesene polymer may be present in the electrodepositable coating composition in an amount of 0.1% by weight to 10% by weight, such as 0.1% to 4% by weight, such as 0.1% to 3% by weight, such as 0.1% to 2% by weight, such as 0.1% to 1% by weight, such as 0.5% by weight to 4% by weight, such as 0.75% by weight to 3% by weight, based on the total weight of the resin blend solids.

The polyfarnesene polymer may also be incorporated into an electrodepositable coating composition as a reaction product comprising the residue of the polyfarnesene polymer. For example, at least one functional group, such as a hydroxyl group, of the polyfarnesene polymer may be reacted with a compound comprising a functional group reactive towards hydroxyl functional groups (e.g., isocyanato, epoxide, etc.) to form a reaction product, wherein the reaction product comprises the residue of the polyfarnesene polymer. In another example, a hydroxyl group of the polyfarnesene polymer may be reacted with an anhydride which may be further reacted with an epoxide-functional polymer to form a reaction product comprising the residue of the polyfarnesene polymer. When present as a reaction product, the weight of the residue of the polyfarnesene polymer present in the reaction product may be present in the amounts described above based on the total weight of the resin blend solids. For example, the polyfarnesene polymer will be present in the electrodepositable coating composition in an amount of 3% by weight if the amount of polyfarnesene polymer reacted into the reaction product makes up 3% of the total weight of the resin blend solids.

Ionic Salt Group-Containing Film-Forming Polymer

According to the present invention, the electrodepositable coating composition further comprises an ionic salt group-containing film-forming polymer. The ionic film-forming polymer is different from the polyfarnesene polymer described above.

The ionic salt group-containing film-forming polymer may comprise functional groups. The functional groups of the ionic salt group-containing film-forming polymer may comprise active hydrogen functional groups. The term "active hydrogen" refers to hydrogens which, because of their position in the molecule, display activity according to the Zerewitinoff test, as described in the JOURNAL OF THE AMERICAN CHEMICAL SOCIETY, Vol. 49, page 3181 (1927). Accordingly, active hydrogens include hydrogen atoms attached to oxygen, nitrogen, or sulfur, and thus useful compounds will include those hydroxyl, thiol, primary amino, and/or secondary amino groups (in any combination). Ionic salt group-containing film-forming polymers that comprise active hydrogen functional groups may be referred to as active hydrogen-containing, ionic salt group-containing film-forming polymers. Other non-limiting examples of functional groups include epoxide functional groups, amide functional groups, carbamate functional groups, carboxylic acid groups, phosphorous acid groups (such as phosphoric acid and phosphonic acid), and sulfonic acid groups. The ionic salt group-containing film-forming polymer may comprise two or more functional groups, such as three or more functional groups per molecule.

The ionic salt group-containing film-forming polymer may comprise a cationic salt group-containing film-forming polymer or an anionic salt group-containing film-forming polymer.

The cationic salt group-containing film-forming polymer may be used in a cationic electrodepositable coating composition. As used herein, the term "cationic salt group-containing film-forming polymer" refers to polymers that include at least partially neutralized cationic groups, such as sulfonium groups and ammonium groups, that impart a positive charge. The cationic salt group containing film-forming polymer may be used in a cationic electrodepositable coating composition.

The cationic salt group-containing film-forming polymer may comprise functional groups. The functional groups of the cationic salt group-containing film-forming polymer may comprise active hydrogen functional groups. Cationic salt group-containing film-forming polymers that comprise active hydrogen functional groups may be referred to as active hydrogen-containing, cationic salt group-containing film-forming polymers.

Examples of polymers that are suitable for use as the cationic salt group-containing film-forming polymer in the present invention include, but are not limited to, alkyd polymers, acrylics, polyepoxides, polyamides, polyurethanes, polyureas, polyethers, and polyesters, among others.

More specific examples of suitable active hydrogen-containing, cationic salt group containing film-forming polymers include polyepoxide-amine adducts, such as the adduct of a polyglycidyl ethers of a polyphenol, such as Bisphenol A, and primary and/or secondary amines, such as are described in U.S. Pat. No. 4,031,050 at col. 3, line 27 to col. 5, line 50, U.S. Pat. No. 4,452,963 at col. 5, line 58 to col. 6, line 66, and U.S. Pat. No. 6,017,432 at col. 2, line 66 to col. 6, line 26, these portions of which being incorporated herein by reference. A portion of the amine that is reacted with the polyepoxide may be a ketimine of a polyamine, as is described in U.S. Pat. No. 4,104,147 at col. 6, line 23 to col. 7, line 23, the cited portion of which being incorporated herein by reference. Also suitable are ungelled polyepoxide-polyoxyalkylenepolyamine resins, such as are described in U.S. Pat. No. 4,432,850 at col. 2, line 60 to col. 5, line 58, the cited portion of which being incorporated herein by reference. In addition, cationic acrylic resins, such as those described in U.S. Pat. No. 3,455,806 at col. 2, line 18 to col. 3, line 61 and U.S. Pat. No. 3,928,157 at col. 2, line 29 to col. 3, line 21, these portions of both of which are incorporated herein by reference, may be used.

Besides amine salt group-containing resins, quaternary ammonium salt group-containing resins may also be employed as a cationic salt group-containing film-forming polymer in the present invention. Examples of these resins are those which are formed from reacting an organic polyepoxide with a tertiary amine acid salt. Such resins are described in U.S. Pat. No. 3,962,165 at col. 2, line 3 to col. 11, line 7; U.S. Pat. No. 3,975,346 at col. 1, line 62 to col. 17, line 25 and U.S. Pat. No. 4,001,156 at col. 1, line 37 to col. 16, line 7, these portions of which being incorporated herein by reference. Examples of other suitable cationic resins include ternary sulfonium salt group-containing resins, such as those described in U.S. Pat. No. 3,793,278 at col. 1, line 32 to col. 5, line 20, this portion of which being incorporated herein by reference. Also, cationic resins which cure via a transesterification mechanism, such as described in European Pat. Application No. 12463B1 at pg. 2, line 1 to pg. 6, line 25, this portion of which being incorporated herein by reference, may also be employed.

Other suitable cationic salt group-containing film-forming polymers include those that may form photodegradation resistant electrodepositable coating compositions. Such polymers include the polymers comprising cationic amine salt groups which are derived from pendant and/or terminal amino groups that are disclosed in U.S. Pat. Application Publication No. 2003/0054193 A1 at paragraphs [0064] to [0088], this portion of which being incorporated herein by reference. Also suitable are the active hydrogen-containing, cationic salt group-containing resins derived from a polyglycidyl ether of a polyhydric phenol that is essentially free of aliphatic carbon atoms to which are bonded more than one aromatic group, which are described in U.S. Pat. Application Publication No. 2003/0054193 A1 at paragraphs [0096] to [0123], the cited portion of which is being incorporated herein by reference.

The active hydrogen-containing, cationic salt group-containing film-forming polymer is made cationic and water dispersible by at least partial neutralization with an acid. Suitable acids include organic and inorganic acids. Non-limiting examples of suitable organic acids include formic acid, acetic acid, methanesulfonic acid, and lactic acid. Non-limiting examples of suitable inorganic acids include phosphoric acid and sulfamic acid. By "sulfamic acid" is meant sulfamic acid itself or derivatives thereof such as those having the formula:

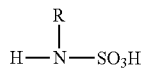

wherein R is hydrogen or an alkyl group having 1 to 4 carbon atoms. Mixtures of the above-mentioned acids also may be used in the present invention.

The extent of neutralization of the cationic salt group-containing film-forming polymer may vary with the particular polymer involved. However, sufficient acid should be used to sufficiently neutralize the cationic salt-group containing film-forming polymer such that the cationic salt-group containing film-forming polymer may be dispersed in an aqueous dispersing medium. For example, the amount of acid used may provide at least 20% of all of the total theoretical neutralization. Excess acid may also be used beyond the amount required for 100% total theoretical neutralization. For example, the amount of acid used to neutralize the cationic salt group-containing film-forming polymer may be ≥0.1% based on the total amines in the active hydrogen-containing, cationic salt group-containing film-forming polymer. Alternatively, the amount of acid used to neutralize the active hydrogen-containing, cationic salt group-containing film-forming polymer may be ≤100% based on the total amines in the active hydrogen-containing, cationic salt group-containing film-forming polymer. The total amount of acid used to neutralize the cationic salt group-containing film-forming polymer may range between any combination of values, which were recited in the preceding sentences, inclusive of the recited values. For example, the total amount of acid used to neutralize the active hydrogen-containing, cationic salt group-containing film-forming polymer may be 20%, 35%, 50%, 60%, or 80% based on the total amines in the cationic salt group-containing film-forming polymer.

According to the present invention, the cationic salt group-containing film-forming polymer may be present in the cationic electrodepositable coating composition in an amount of at least 40% by weight, such as at least 50% by weight, such as at least 60% by weight, and may be present in the in an amount of no more than 90% by weight, such as no more than 80% by weight, such as no more than 75% by weight, based on the total weight of the resin solids of the electrodepositable coating composition. The cationic salt group-containing film-forming polymer may be present in the cationic electrodepositable coating composition in an amount of 40% to 90% by weight, such as 50% to 80% by weight, such as 60% to 75% by weight, based on the total weight of the resin solids of the electrodepositable coating composition.

According to the present invention, the ionic salt group containing film-forming polymer may comprise an anionic salt group containing film-forming polymer. As used herein, the term "anionic salt group containing film-forming polymer" refers to an anionic polymer comprising at least partially neutralized anionic functional groups, such as carboxylic acid and phosphoric acid groups that impart a negative charge. The anionic salt group containing film-forming polymer may be used in an anionic electrodepositable coating composition.

The anionic salt group-containing film-forming polymer may comprise functional groups. The functional groups of the anionic salt group-containing film-forming polymer may comprise active hydrogen functional groups. Anionic salt group-containing film-forming polymers that comprise active hydrogen functional groups may be referred to as active hydrogen-containing, anionic salt group-containing film-forming polymers.

The anionic salt group-containing film-forming polymer may comprise base-solubilized, carboxylic acid group-containing film-forming polymers such as the reaction product or adduct of a drying oil or semi-drying fatty acid ester with a dicarboxylic acid or anhydride; and the reaction product of a fatty acid ester, unsaturated acid or anhydride and any additional unsaturated modifying materials which are further reacted with polyol. Also suitable are the at least partially neutralized interpolymers of hydroxy-alkyl esters of unsaturated carboxylic acids, unsaturated carboxylic acid and at least one other ethylenically unsaturated monomer. Still another suitable anionic electrodepositable resin comprises an alkyd-aminoplast vehicle, i.e., a vehicle containing an alkyd resin and an amine-aldehyde resin. Another suitable anionic electrodepositable resin composition comprises mixed esters of a resinous polyol. Other acid functional polymers may also be used such as phosphatized polyepoxide or phosphatized acrylic polymers. Exemplary phosphatized polyepoxides are disclosed in U.S. Pat. Application Publication No. 2009-0045071 at [0004]-[0015] and U.S. patent application Ser. No. 13/232,093 at [0014]-[0040], the cited portions of which being incorporated herein by reference. Also suitable are resins comprising one or more pendent carbamate functional groups, such as those described in U.S. Pat. No. 6,165,338.

According to the present invention, the anionic salt group-containing film-forming polymer may be present in the anionic electrodepositable coating composition in an amount of at least 50% by weight, such as at least 55% by weight, such as at least 60% by weight, and may be present in an amount of no more than 90% by weight, such as no more than 80% by weight, such as no more than 75% by weight, based on the total weight of the resin solids of the electrodepositable coating composition. The anionic salt group-containing film-forming polymer may be present in the anionic electrodepositable coating composition in an amount 50% to 90%, such as 55% to 80%, such as 60% to 75%, based on the total weight of the resin solids of the electrodepositable coating composition.

Curing Agent

According to the present invention, the electrodepositable coating composition of the present invention may further comprise a curing agent. The curing agent is reactive with functional groups on the film-forming polymer. For example, the curing agent may react with the functional groups, such as active hydrogen groups, of the ionic salt group-containing film-forming polymer to effectuate cure of the coating composition to form a coating. As used herein, the term "cure", "cured" or similar terms, as used in connection with the electrodepositable coating compositions described herein, means that at least a portion of the components that form the electrodepositable coating composition are crosslinked to form a coating. Additionally, curing of the electrodepositable coating composition refers to subjecting said composition to curing conditions (e.g., elevated temperature) leading to the reaction of the reactive functional groups of the components of the electrodepositable coating composition, and resulting in the crosslinking of the components of the composition and formation of an at least partially cured coating. Non-limiting examples of suitable curing agents are at least partially blocked polyisocyanates, aminoplast resins and phenoplast resins, such as phenol-formaldehyde condensates including allyl ether derivatives thereof.

Suitable at least partially blocked polyisocyanates include aliphatic polyisocyanates, aromatic polyisocyanates, and mixtures thereof. The curing agent may comprise an at least partially blocked aliphatic polyisocyanate. Suitable at least partially blocked aliphatic polyisocyanates include, for example, fully blocked aliphatic polyisocyanates, such as those described in U.S. Pat. No. 3,984,299 at col. 1 line 57 to col. 3 line 15, this portion of which is incorporated herein by reference, or partially blocked aliphatic polyisocyanates that are reacted with the polymer backbone, such as is described in U.S. Pat. No. 3,947,338 at col. 2 line 65 to col. 4 line 30, this portion of which is also incorporated herein by reference. By "blocked" is meant that the isocyanate groups have been reacted with a compound such that the resultant blocked isocyanate group is stable to active hydrogens at ambient temperature but reactive with active hydrogens in the film forming polymer at elevated temperatures, such as between 90° C. and 200° C. The polyisocyanate curing agent may be a fully blocked polyisocyanate with substantially no free isocyanate groups.

The polyisocyanate curing agent may comprise a diisocyanate, higher functional polyisocyanates or combinations thereof. For example, the polyisocyanate curing agent may comprise aliphatic and/or aromatic polyisocyanates. Aliphatic polyisocyanates may include (i) alkylene isocyanates, such as trimethylene diisocyanate, tetramethylene diisocyanate, pentamethylene diisocyanate, hexamethylene diisocyanate ("HDI"), 1,2-propylene diisocyanate, 1,2-butylene diisocyanate, 2,3-butylene diisocyanate, 1,3-butylene diisocyanate, ethylidene diisocyanate, and butylidene diisocyanate, and (ii) cycloalkylene isocyanates, such as 1,3-cyclopentane diisocyanate, 1,4-cyclohexane diisocyanate, 1,2-cyclohexane diisocyanate, isophorone diisocyanate, methylene bis(4-cyclohexylisocyanate) ("HMDI"), the cyclo-trimer of 1,6-hexmethylene diisocyanate (also known as the isocyanurate trimer of HDI, commercially available as Desmodur N3300 from Convestro AG), and meta-tetramethylxylylene diisocyanate (commercially available as TMXDI® from Allnex SA). Aromatic polyisocyanates may include (i) arylene isocyanates, such as m-phenylene diisocyanate, p-phenylene diisocyanate, 1,5-naphthalene diisocyanate and 1,4-naphthalene diisocyanate, and (ii) alkarylene isocyanates, such as 4,4'-diphenylene methane ("MDI"), 2,4-tolylene or 2,6-tolylene diisocyanate ("TDI"), or mixtures thereof, 4,4-toluidine diisocyanate and xylylene diisocyanate. Triisocyanates, such as triphenyl methane-4, 4',4"-triisocyanate, 1,3,5-triisocyanato benzene and 2,4,6-triisocyanato toluene, tetraisocyanates, such as 4,4'-diphenyldimethyl methane-2,2',5,5'-tetraisocyanate, and polymerized polyisocyanates, such as tolylene diisocyanate dimers and trimers and the like, may also be used. The curing agent may comprise a blocked polyisocyanate selected from a polymeric polyisocyanate, such as polymeric HDI, polymeric MDI, polymeric isophorone diisocyanate, and the like. The curing agent may also comprise a blocked trimer of hexamethylene diisocyanate available as Desmodur N3300® from Covestro AG. Mixtures of polyisocyanate curing agents may also be used.

The polyisocyanate curing agent may be at least partially blocked with at least one blocking agent selected from a 1,2-alkane diol, for example 1,2-propanediol; a 1,3-alkane diol, for example 1,3-butanediol; a benzylic alcohol, for example, benzyl alcohol; an allylic alcohol, for example, allyl alcohol; caprolactam; a dialkylamine, for example dibutylamine; and mixtures thereof. The polyisocyanate curing agent may be at least partially blocked with at least one 1,2-alkane diol having three or more carbon atoms, for example 1,2-butanediol.

Other suitable blocking agents include aliphatic, cycloaliphatic, or aromatic alkyl monoalcohols or phenolic compounds, including, for example, lower aliphatic alcohols, such as methanol, ethanol, and n-butanol; cycloaliphatic alcohols, such as cyclohexanol; aromatic-alkyl alcohols, such as phenyl carbinol and methylphenyl carbinol; and phenolic compounds, such as phenol itself and substituted phenols wherein the substituents do not affect coating operations, such as cresol and nitrophenol. Glycol ethers and glycol amines may also be used as blocking agents. Suitable glycol ethers include ethylene glycol butyl ether, diethylene glycol butyl ether, ethylene glycol methyl ether and propylene glycol methyl ether. Other suitable blocking agents include oximes, such as methyl ethyl ketoxime, acetone oxime and cyclohexanone oxime.

Additionally, the polyfarnesene polymer may include hydroxyl-functional end groups, and therefore, may be used as a blocking agent either alone or in combination with other suitable blocking agents. Accordingly, the blocked polyisocyanate may be at least partially blocked with the polyfarnesene polymer as a blocking agent.

The curing agent may comprise an aminoplast resin. Aminoplast resins are condensation products of an aldehyde with an amino- or amido-group carrying substance. Condensation products obtained from the reaction of alcohols and an aldehyde with melamine, urea or benzoguanamine may be used. However, condensation products of other amines and amides may also be employed, for example, aldehyde condensates of triazines, diazines, triazoles, guanidines, guanamines and alkyl- and aryl-substituted derivatives of such compounds, including alkyl- and aryl-substituted ureas and alkyl- and aryl-substituted melamines. Some examples of such compounds are N,N'-dimethyl urea, benzourea, dicyandiamide, formaguanamine, acetoguanamine, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 3,4,6-tris(ethylamino)-1,3,5-triazine, and the like. Suitable aldehydes include formaldehyde, acetaldehyde, crotonaldehyde, acrolein, benzaldehyde, furfural, glyoxal and the like.

The aminoplast resins may contain methylol or similar alkylol groups, and at least a portion of these alkylol groups may be etherified by a reaction with an alcohol to provide organic solvent-soluble resins. Any monohydric alcohol may be employed for this purpose, including such alcohols as methanol, ethanol, propanol, butanol, pentanol, hexanol, heptanol and others, as well as benzyl alcohol and other aromatic alcohols, cyclic alcohol such as cyclohexanol, monoethers of glycols such as Cello solves and Carbitols, and halogen-substituted or other substituted alcohols, such as 3-chloropropanol and butoxyethanol.

Non-limiting examples of commercially available aminoplast resins are those available under the trademark CYMEL® from Allnex Belgium SA/NV, such as CYMEL 1130 and 1156, and RESIMENE® from INEOS Melamines, such as RESIMENE 750 and 753. Examples of suitable aminoplast resins also include those described in U.S. Pat. No. 3,937,679 at col. 16, line 3 to col. 17, line 47, this portion of which being hereby incorporated by reference. As is disclosed in the aforementioned portion of the '679 patent, the aminoplast may be used in combination with the methylol phenol ethers.

Phenoplast resins are formed by the condensation of an aldehyde and a phenol. Suitable aldehydes include formaldehyde and acetaldehyde. Methylene-releasing and aldehyde-releasing agents, such as paraformaldehyde and hexamethylene tetramine, may also be utilized as the aldehyde agent. Various phenols may be used, such as phenol itself, a cresol, or a substituted phenol in which a hydrocarbon radical having either a straight chain, a branched chain or a cyclic structure is substituted for a hydrogen in the aromatic ring. Mixtures of phenols may also be employed. Some specific examples of suitable phenols are p-phenylphenol, p-tert-butylphenol, p-tert-amylphenol, cyclopentylphenol and unsaturated hydrocarbon-substituted phenols, such as the monobutenyl phenols containing a butenyl group in ortho, meta or para position, and where the double bond occurs in various positions in the hydrocarbon chain.

Aminoplast and phenoplast resins, as described above, are described in U.S. Pat. No. 4,812,215 at col. 6, line 20 to col. 7, line 12, the cited portion of which being incorporated herein by reference.

The curing agent may be present in the cationic electrodepositable coating composition in an amount of at least 10% by weight, such as at least 20% by weight, such as at least 25% by weight, and may be present in an amount of no more than 60% by weight, such as no more than 50% by weight, such as no more than 40% by weight, based on the total weight of the resin solids of the electrodepositable coating composition. The curing agent may be present in the cationic electrodepositable coating composition in an amount of 10% to 60% by weight, such as 20% to 50% by weight, such as 25% to 40% by weight, based on the total weight of the resin solids of the electrodepositable coating composition.

The curing agent may be present in the anionic electrodepositable coating composition in an amount of at least 10% by weight, such as at least 20% by weight, such as at least 25% by weight, and may be present in an amount of no more than 50% by weight, such as no more than 45% by weight, such as no more than 40% by weight, based on the total weight of the resin solids of the electrodepositable coating composition. The curing agent may be present in the anionic electrodepositable coating composition in an amount of 10% to 50% by weight, such as 20% to 45% by weight, such as 25% to 40% by weight, based on the total weight of the resin solids of the electrodepositable coating composition.

Further Components of the Electrodepositable Coating Compositions

The electrodepositable coating composition according to the present invention may comprise one or more further components in addition to the ionic salt group-containing film-forming polymer and the curing agent described above.

According to the present invention, the electrodepositable coating composition comprises an aqueous medium comprising water and optionally one or more organic solvent(s). The aqueous medium be present in amounts of, for example, 40% to 90% by weight, such as 50% to 75% by weight, based on total weight of the electrodepositable coating composition. Examples of suitable organic solvents include oxygenated organic solvents, such as monoalkyl ethers of ethylene glycol, diethylene glycol, propylene glycol, and dipropylene glycol which contain from 1 to 10 carbon atoms in the alkyl group, such as the monoethyl and monobutyl ethers of these glycols. Examples of other at least partially water-miscible solvents include alcohols such as ethanol, isopropanol, butanol and diacetone alcohol. If used, the organic solvents may typically be present in an amount of less than 10% by weight, such as less than 5% by weight, based on total weight of the electrodepositable coating composition. The electrodepositable coating composition may be provided in the form of a dispersion, such as an aqueous dispersion.

According to the present invention, the total solids content of the electrodepositable coating composition may be at least 1% by weight, such as at least 5% by weight, and may be no more than 50% by weight, such as no more than 40% by weight, such as no more than 20% by weight, based on the total weight of the electrodepositable coating composition. The total solids content of the electrodepositable coating composition may be from 1% to 50% by weight, such as 5% to 40% by weight, such as 5% to 20% by weight, based on the total weight of the electrodepositable coating composition. As used herein, "total solids" refers to the non-volatile content of the electrodepositable coating composition, i.e., materials which will not volatilize when heated to 110° C. for 15 minutes.

According to the present invention, the electrodepositable coating composition may optionally comprise a catalyst to catalyze the reaction between the curing agent and the polymers. Examples of catalysts suitable for cationic electrodepositable coating compositions include, without limitation, organotin compounds (e.g., dibutyltin oxide and dioctyltin oxide) and salts thereof (e.g., dibutyltin diacetate); other metal oxides (e.g., oxides of cerium, zirconium and bismuth) and salts thereof (e.g., bismuth sulfamate and bismuth lactate); or a cyclic guanidine as described in U.S. Pat. No. 7,842,762 at col. 1, line 53 to col. 4, line 18 and col. 16, line 62 to col. 19, line 8, the cited portions of which being incorporated herein by reference. Examples of catalysts suitable for anionic electrodepositable coating compositions include latent acid catalysts, specific examples of which are identified in WO 2007/118024 at [0031] and include, but are not limited to, ammonium hexafluoroantimonate, quaternary salts of $SbF_6$ (e.g., NACURE® XC-7231), t-amine salts of $SbF_6$(e.g., NACURE® XC-9223), Zn salts of triflic acid (e.g., NACURE® A202 and A218), quaternary salts of triflic acid (e.g., NACURE® XC-A230), and diethylamine salts of triflic acid (e.g., NACURE® A233), all commercially available from King Industries, and/or mixtures thereof. Latent acid catalysts may be formed by preparing a derivative of an acid catalyst such as para-toluenesulfonic acid (pTSA) or other sulfonic acids. For example, a well-known group of blocked acid catalysts are amine salts of aromatic sulfonic acids, such as pyridinium para-toluenesulfonate. Such sulfonate salts are less active than the free acid in promoting crosslinking. During cure, the catalysts may be activated by heating.

According to the present invention, the electrodepositable coating composition may be substantially free of tin. As used herein, an electrodepositable coating composition is substantially free of tin if tin is present in an amount of less than 0.1% by weight, based on the total weight of the resin blend solids. The electrodepositable coating composition may be essentially free of tin. As used herein, an electrodepositable coating composition may be essentially free of tin if tin is present in an amount of less than 0.01% by weight, based on the total weight of the resin blend solids. The electrodepositable coating composition may be completely free of tin. As used here, an electrodepositable coating composition is completely free of tin if tin is not present in the composition, i.e., 0.00% by weight, based on the total resin blend solids.

According to the present invention, the electrodepositable coating composition may comprise other optional ingredients, such as a pigment composition and, if desired, various additives such as fillers, plasticizers, anti-oxidants, biocides, UV light absorbers and stabilizers, hindered amine light stabilizers, defoamers, fungicides, dispersing aids, flow control agents, surfactants, wetting agents, or any combination thereof. Alternatively, the electrodepositable coating composition may be completely free of any of the optional ingredients, i.e., the optional ingredient is not present in the electrodepositable coating composition. The pigment composition may comprise, for example, iron oxides, lead oxides, strontium chromate, carbon black, coal dust, titanium dioxide, talc, barium sulfate, as well as color pigments such as cadmium yellow, cadmium red, chromium yellow and the like. The pigment content of the dispersion may be expressed as the pigment-to-resin weight ratio, and may be within the range of 0.03:1 to 0.6:1, when pigment is used. The other additives mentioned above may be present in the electrodepositable coating composition in amounts of 0.01% to 3% by weight, based on total weight of the resin solids of the electrodepositable coating composition.

The electrodepositable coating composition of the present invention may optionally further comprise a polybutadiene polyol. As used herein, the term "polybutadiene polyol" refers to polymers comprising the residue of polybutadiene, and optionally other monomers, that do not include a significant amount of the residue of a farnesene monomer, for example, less than 1% by weight of the constitutional units comprise the residue of a farnesene monomer, such as less than 0.1% by weight, based on the total weight of the polybutadiene polymer. Suitable polybutadiene polyols include the KRASOL LBH family of polybutadiene polyols and the POLY BD family of polybutadiene polyols, each available from Cray Valley.

The polybutadiene polyol may be present in the electrodepositable coating composition in an amount of at least 0.1% by weight, such as at least 0.5% by weight, such as at least 0.75% by weight, based on the total resin solids weight of the composition. The polybutadiene polyol may be present in the electrodepositable coating composition in an amount of no more than 10% by weight, such as no more than 4% by weight, such as no more than 3% by weight, such as no more than 2% by weight, such as no more than 1% by weight, based on the total resin solids weight of the composition. The polybutadiene polyol may be present in the electrodepositable coating composition in an amount of from 0.1% by weight to 10% by weight, such as 0.1% to 4% by weight, such as 0.1% to 3% by weight, such as 0.1% to 2% by weight, such as 0.1% to 1% by weight, such as 0.5% by weight to 4% by weight, such as 0.75% by weight to 3% by weight, based on the total resin solids weight of the composition.

Alternatively, the electrodepositable coating composition may be substantially free, essentially free, or completely free of polybutadiene polyol. As used herein, the composition is "substantially free" of polybutadiene polyol if polybutadiene polyol is present, if at all, in an amount of no more than 0.1% by weight, based on the total resin solids of the composition. As used herein, the composition is "essentially free" of polybutadiene polyol if polybutadiene polyol is present, if at all, in an amount of no more than 0.01% by weight, based on the total resin solids of the composition. As used herein, the composition is "completely free" of polybutadiene polyol if polybutadiene polyol is not present, i.e., 0.000% by weight, based on the total resin solids of the composition.

The electrodepositable coating composition of the present invention may optionally further comprise a polybutylene oxide polymer. The polybutylene oxide polymer which may comprise a copolymer of butylene oxide and propylene oxide, such as, for example, a block, gradient, alternate or random copolymer. According to the present invention, the molar ratio of butylene oxide to propylene oxide may be at least 1:1, such as at least 3:1, such as at least 5:1, and in some instances, may be no more than 50:1, such as no more than 30:1, such as no more than 20:1. According to the present invention, the molar ratio of butylene oxide to propylene oxide may be 1:1 to 50:1, such as 3:1 to 30:1, such as 5:1 to 20:1.

The polybutylene oxide polymer comprises at least two hydroxyl functional groups, and may be difunctional, trifunctional, tetrafunctional, or more. The hydroxyl equivalent weight of the polybutylene oxide polymer may be at least 100 g/mol, such as at least 200 g/mol, such as at least 400 g/mol, and may be no more than 2,000 g/mol, such as no more than 1,000 g/mol, such as no more than 800 g/mol. The hydroxyl equivalent weight of the polybutylene oxide polymer may be 100 g/mol to 2,000 g/mol, such as 200 g/mol to 1,000 g/mol, such as 400 g/mol to 800 g/mol. As used herein, the "hydroxyl equivalent weight" is theoretical and determined by dividing the molecular weight of the polybutylene oxide polymer by the number of hydroxyl groups present in the polybutylene oxide polymer.

The polybutylene oxide polymer may be present in the electrodepositable coating composition, if at all, in an amount of 0.1% to 10% by weight, such as 0.5% to 4% by weight, such as 0.75% to 3% by weight, based on the total resin solids weight of the composition.

The polybutylene oxide polymer may have a z-average molecular weight (Mz) of 200 g/mol to 5,000 g/mol, such as 400 g/mol to 3,000 g/mol, such as 600 g/mol to 2,000 g/mol. As used herein, the term "z-average molecular weight ($M_z$)" means the z-average molecular weight ($M_z$) as determined by Gel Permeation Chromatography using Waters 2695 separation module with a Waters 410 differential refractometer (RI detector), polystyrene standards having molecular weights of from approximately 500 g/mol to 900,000 g/mol, tetrahydrofuran (THF) with lithium bromide(LiBr) as the eluent at a flow rate of 0.5 mL/min, and one Asahipak GF-510 HQ column for separation.

Alternatively, the electrodepositable coating composition may be substantially free, essentially free, or completely free of a polybutylene oxide polymer.

According to the present invention, the electrodepositable coating composition may optionally further comprise a polyetheramine-adduct comprising an ungelled ionic reaction product prepared from reactants comprising: (a) a reaction product prepared from reactants comprising: (1) a polyol; and (2) an epoxy functional material; and (b) a polyetheramine.

Examples of suitable polyols useful for forming the ungelled ionic reaction product include resorcinol, dihydroxy benzene, aliphatic, cycloaliphatic or aralaphatic hydroxyl containing compounds, such as ethylene glycol, propylene glycol, bisphenol A, dihydroxyl cyclohexane, dimethylol cyclohexane, or any combination thereof. The polyol may be present in the polyetheramine adduct in an amount of about 0% to 20% by weight based on the total weight of the reactants that form the polyester reaction product, such as 0% to 15% by weight.

Examples of suitable epoxy-functional materials useful for forming the ungelled ionic reaction product contain at least one epoxy group in the molecule, such as di- or polyglycidyl ethers of polyhydric alcohols, such as a polyglycidyl ether of bisphenol A. Suitable epoxy-functional materials may have an epoxy equivalent weight ranging from about 90 to about 2000, as measured by titration with perchloric acid using methyl violet as an indicator. The epoxy-functional material may comprise about 10% to 40% by weight based on the total weight of the epoxy functional polyester, such as 15% to 35% by weight of the epoxy functional material is combined or reacted with the polyether described above to form the epoxy functional polyester.

According to the present invention, the polyetheramine adduct may be formed by reacting the ungelled ionic reaction product with at least one polyetheramine such as one characterized by propylene oxide, ethylene oxide, or mixed propylene oxide and ethylene oxide repeating units in their respective structures, such as, for example, one of the Jeffamine series products (commercially available from Huntsman Corporation). Examples of such polyetheramines include aminated propoxylated pentaerythritols, such as Jeffamine XTJ-616, and those represented by Formulas (I) through (III).

According to Formula (I) of the present invention the polyetheramine may comprise or represent:

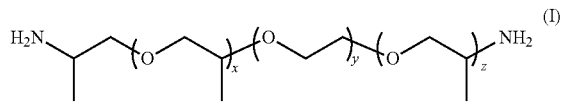

wherein y=0-39, x+z=1-68.

Suitable polyetheramines represented by Formula (I) include, but are not limited to, amine-terminated polyethylene glycol such as Huntsman Corporation Jeffamine ED series, such as Jeffamine HK-511, Jeffamine ED-600, Jeffamine ED-900 and Jeffamine ED-2003, and amine-terminated polypropylene glycol such as Huntsman Corporation Jeffamine D series, such as Jeffamine D-230, Jeffamine D-400, Jeffamine D-2000 and Jeffamine D-4000.

According to Formula (II) of the present invention the polyetheramine may comprise or represent:

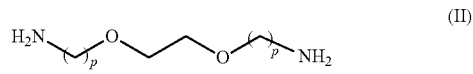

wherein each p independently is 2 or 3.

Suitable polyetheramines represented by Formula (II) include, but are not limited to, amine-terminated polyethylene glycol-based diamine, such as Huntsman Corporation Jeffamine EDR series, such as Jeffamine EDR-148 and Jeffamine EDR-176.

According to Formula (III) of the present invention the polyetheramine may comprise or represent:

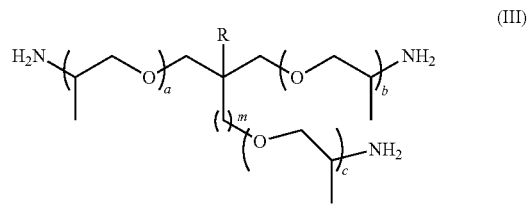

wherein R is H or $C_2H_5$, m=0 or 1, a+b+c=5-85.

Suitable polyetheramines represented by Formula (III) include, but are not limited to, amine-terminated propoxylated trimethylolpropane or glycerol, such as Huntsman Corporation Jeffamine T series, such as Jeffamine T-403, Jeffamine T-3000 and Jeffamine T-5000.

Further examples of the polyetheramine-adduct are those described in U.S. Pat. Nos. 4,420,574, and 4,423,166, which are incorporated herein by reference.

According to the present invention, the polyetheramine-adduct may be present in the electrodepositable coating composition in an amount of 1% to 20% by weight based on the total weight of the resin blend solids, such as 3% to 15% by weight, such as 5% to 13% by weight.

Alternatively, the electrodepositable coating composition may be substantially free, essentially free, or completely free of a polyetheramine-adduct.

According to the present invention, the electrodepositable coating composition optionally may further comprise a polyamine-dialdehyde adduct comprising, or in some cases consisting of, or in some cases consisting essentially of, a polymerization product of a polyamine and a dialdehyde. Suitable polyamine-dialdehyde adducts are described in, for example, U.S. Publication No. 2018/0002545A1, at paragraphs [0010] through [0028], the cited portion of which is incorporated herein by reference. For example, the polyamine-dialdehyde adduct may comprise an adduct of a polyamine and glyoxal.

The polyamine-dialdehyde adduct may be present in the electrodepositable coating composition, if at all, in an amount of 0.1% to 10% by weight, such as 0.5% to 7% by weight, such as 0.75% to 5% by weight, such as 1% to 4% by weight, based on the total resin solids weight of composition.

Alternatively, the electrodepositable coating composition may be substantially free, essentially free, or completely free of a polyamine-dialdehyde adduct.

According to the present invention, the electrodepositable coating composition optionally may further comprise an epoxy microgel. A non-limiting example of a suitable epoxy microgel is provided in U.S. Pub. No. 2012/0024703 A1 at Example 3, the cited portion of which is incorporated herein by reference.

The epoxy microgel may be present in the electrodepositable coating composition, if at all, in an amount of 0.1% to 10% by weight, such as 0.5% to 4% by weight, such as 0.75% to 3% by weight, based on the total resin solids weight of composition.

Alternatively, the electrodepositable coating composition may be substantially free, essentially free, or completely free of an epoxy microgel.

According to the present invention, the electrodepositable coating composition optionally may further comprise an acrylic microgel. A non-limiting example of a suitable acrylic microgel is provided in U.S. Pub. No. 2013/0306477 A1 at paragraphs [0012] through [0040], the cited portion of which is incorporated herein by reference.

The acrylic microgel may be present in the electrodepositable coating composition, if at all, in an amount of 0.1% to 10% by weight, such as 0.5% to 4% by weight, such as 0.75% to 3% by weight, based on the total resin solids weight of composition.

Alternatively, the electrodepositable coating composition may be substantially free, essentially free, or completely free of an acrylic microgel.

According to the present invention, the electrodepositable coating composition optionally may further comprise an acrylic polymer comprising a polymerization product of a polymeric dispersant and a second stage ethylenically unsaturated monomer composition comprising greater than 40% by weight of a second stage hydroxyl-functional (meth)acrylate monomer, based on the total weight of the second stage ethylenically unsaturated monomer. A non-limiting example of an acrylic polymer is provided in Int'l Pub. No. WO 2018/160799 A1 at paragraphs [0013] through [0061], the cited portion of which is incorporated herein by reference.

The acrylic polymer may be present in the electrodepositable coating composition, if at all, in an amount of 0.1% to 10% by weight, such as 0.5% to 4% by weight, such as 0.75% to 3% by weight, based on the total resin solids weight of composition.

Alternatively, the electrodepositable coating composition may be substantially free, essentially free, or completely free of an acrylic polymer comprising a polymerization product of a polymeric dispersant and a second stage ethylenically unsaturated monomer composition comprising greater than 40% by weight of a second stage hydroxyl-functional (meth)acrylate monomer, based on the total weight of the second stage ethylenically unsaturated monomer.

Substrates

The electrodepositable coating composition of the present invention may be applied onto a number of substrates. Accordingly, the present invention is further directed to a substrate that is coated, at least in part, with the electrodepositable coating composition described herein. It will be understood that the electrocoating coating composition can be applied onto a substrate as a monocoat or as a coating layer in a multi-layer coating composite. The electrodepositable coating composition may be electrophoretically deposited upon any electrically conductive substrate. Suitable substrates include metal substrates, metal alloy substrates, and/or substrates that have been metallized, such as nickel-plated plastic. Additionally, substrates may comprise non-metal conductive materials including composite materials such as, for example, materials comprising carbon fibers or conductive carbon. According to the present invention, the metal or metal alloy may comprise cold rolled steel, hot rolled steel, steel coated with zinc metal, zinc compounds, or zinc alloys, such as electrogalvanized steel, hot-dipped galvanized steel, galvanealed steel, and steel plated with zinc alloy. Aluminum alloys of the 2XXX, 5XXX, 6XXX, or 7XXX series as well as clad aluminum alloys and cast aluminum alloys of the A356 series also may be used as the substrate. Magnesium alloys of the AZ31B, AZ91C, AM60B, or EV31A series also may be used as the substrate. The substrate used in the present invention may also comprise titanium and/or titanium alloys. Other suitable non-ferrous metals include copper and magnesium, as well as alloys of these materials. Suitable metal substrates for use in the present invention include those that are often used in the assembly of vehicular bodies (e.g., without limitation, door, body panel, trunk deck lid, roof panel, hood, roof and/or stringers, rivets, landing gear components, and/or skins used on an aircraft), a vehicular frame, vehicular parts, motorcycles, wheels, industrial structures and components such as appliances, including washers, dryers, refrigerators, stoves, dishwashers, and the like, agricultural equipment, lawn and garden equipment, air conditioning units, heat pump units, lawn furniture, and other articles. As used herein, "vehicle" or variations thereof includes, but is not limited to, civilian, commercial and military aircraft, and/or land vehicles such as cars, motorcycles, and/or trucks. The metal substrate also may be in the form of, for example, a sheet of metal or a fabricated part. It will also be understood that the substrate may be pretreated with a pretreatment solution including a zinc phosphate pretreatment solution such as, for example, those described in U.S. Pat. Nos. 4,793,867 and 5,588,989, or a zirconium containing pretreatment solution such as, for example, those described in U.S. Pat. Nos. 7,749,368 and 8,673,091.

Methods of Coating, Coatings and Coated Substrates

The present invention is also directed to methods for coating a substrate, such as any one of the electroconductive substrates mentioned above. According the present invention such method may comprise electrophoretically applying a coating deposited from an electrodepositable coating composition as described above to at least a portion of the substrate. The method may optionally further comprise curing the coating composition to form an at least partially cured coating on the substrate. According to the present invention, the method may comprise (a) electrophoretically depositing onto at least a portion of the substrate a coating deposited from an electrodepositable coating composition of the present invention and (b) heating the coated substrate to a temperature and for a time sufficient to cure the electrodeposited coating on the substrate. According to the present invention, the method may optionally further comprise (c) applying directly to the at least partially cured electrodeposited coating one or more pigment-containing coating compositions and/or one or more pigment-free coating compositions to form a top coat over at least a portion of the at least partially cured electrodeposited coating, and (d) heating the coated substrate of step (c) to a temperature and for a time sufficient to cure the top coat.

According to the present invention, the cationic electrodepositable coating composition of the present invention may be deposited upon an electrically conductive substrate by placing the composition in contact with an electrically conductive cathode and an electrically conductive anode, with the surface to be coated being the cathode. Following contact with the composition, an adherent film from the coating composition is deposited on the cathode when a sufficient voltage is impressed between the electrodes. The conditions under which the electrodeposition is carried out are, in general, similar to those used in electrodeposition of other types of coatings. The applied voltage may be varied and can be, for example, as low as one volt to as high as several thousand volts, such as between 50 and 500 volts. The current density may be between 0.5 ampere and 15 amperes per square foot and tends to decrease during electrodeposition indicating the formation of an insulating film.

Once the cationic electrodepositable coating composition is electrodeposited over at least a portion of the electroconductive substrate, the coated substrate is heated to a temperature and for a time sufficient to at least partially cure the electrodeposited coating on the substrate. As used herein, the term "at least partially cured" with respect to a coating refers to a coating formed by subjecting the coating composition to curing conditions such that a chemical reaction of at least a portion of the reactive groups of the components of the coating composition occurs to form a coating. The coated substrate may be heated to a temperature ranging from 250° F. to 450° F. (121.1° C. to 232.2° C.), such as from 275° F. to 400° F. (135° C. to 204.4° C.), such as from 300° F. to 360° F. (149° C. to 180° C.). The curing time may be dependent upon the curing temperature as well as other variables, for example, the film thickness of the electrodeposited coating, level and type of catalyst present in the composition and the like. For purposes of the present invention, all that is necessary is that the time be sufficient to effect cure of the coating on the substrate. For example, the curing time can range from 10 minutes to 60 minutes, such as 20 to 40 minutes. The thickness of the resultant cured electrodeposited coating may range from 15 to 50 microns.

According to the present invention, the anionic electrodepositable coating composition of the present invention may be deposited upon an electrically conductive substrate by placing the composition in contact with an electrically conductive cathode and an electrically conductive anode, with the surface to be coated being the anode. Following contact with the composition, an adherent film from the coating composition is deposited on the anode when a sufficient voltage is impressed between the electrodes. The conditions under which the electrodeposition is carried out are, in general, similar to those used in electrodeposition of other types of coatings. The applied voltage may be varied and can be, for example, as low as one volt to as high as several thousand volts, such as between 50 and 500 volts. The current density may be between 0.5 ampere and 15 amperes per square foot and tends to decrease during electrodeposition indicating the formation of an insulating film.

Once the anionic electrodepositable coating composition is electrodeposited over at least a portion of the electroconductive substrate, the coated substrate may be heated to a temperature and for a time sufficient to at least partially cure the electrodeposited coating on the substrate. As used herein, the term "at least partially cured" with respect to a coating refers to a coating formed by subjecting the coating composition to curing conditions such that a chemical reaction of at least a portion of the reactive groups of the components of the coating composition occurs to form a coating. The coated substrate may be heated to a temperature ranging from 200° F. to 450° F. (93° C. to 232.2° C.), such as from 275° F. to 400° F. (135° C. to 204.4° C.), such as from 300° F. to 360° F. (149° C. to 180° C.). The curing time may be dependent upon the curing temperature as well as other variables, for example, film thickness of the electrodeposited coating, level and type of catalyst present in the composition and the like. For purposes of the present invention, all that is necessary is that the time be sufficient to effect cure of the coating on the substrate. For example, the curing time may range from 10 to 60 minutes, such as 20 to 40 minutes. The thickness of the resultant cured electrodeposited coating may range from 15 to 50 microns.

The electrodepositable coating compositions of the present invention may also, if desired, be applied to a substrate using non-electrophoretic coating application techniques, such as flow, dip, spray and roll coating applications. For non-electrophoretic coating applications, the coating compositions may be applied to conductive substrates as well as non-conductive substrates such as glass, wood and plastic.

The present invention is further directed to a coating formed by at least partially curing a coating deposited from the electrodepositable coating composition described herein.

The present invention is further directed to a substrate that is coated, at least in part, with a coating deposited from the electrodepositable coating composition described herein in an at least partially cured state.

According to the present invention, it has been surprisingly discovered that the presence of the polyfarnesene polymer in an electrodepositable coating composition in the amounts disclosed herein results in a reduction in the depth of craters formed in the cured coating during the curing of the electrodepositable coating composition compared to an electrodepositable coating composition that does not include the polyfarnesene polymer.

A quantitative measure of crater depth may be performed by any measurement method known in the art. For example, a quantitative measure of crater depth may be performed by scanning the coated panel using a Mitutoyo Surftest SJ-402 skidless stylus profilometer to examine the topography of crater defects in the cured coating layer. From the scanned profile of the crater, the highest point of the crater rim and lowest point of depth of each of the craters were measured on each side of the crater and the difference determined to determine crater depth. The measurement method is referred to as the "CRATER DEPTH TEST METHOD" herein and is described in more detail in the Examples below. The presence of the polyfarnesene polymer in the electrodepositable coating composition may reduce the crater depth of craters formed in the cured coating as measured by a Mitutoyo Surftest SJ-402 skidless stylus profilometer by at least 10%, such as at least 20%, such as at least 30%, such as at least 40%, such as at least 50%, such as at least 55% compared to a comparative coating composition that does not include the polyfarnesene polymer. The presence of the polyfarnesene polymer in the electrodepositable coating composition may reduce the crater depth as measured by a Mitutoyo Surftest SJ-402 skidless stylus profilometer to a crater depth of no more than 7 microns, such as no more than 6 microns, such as no more than 5 microns, such as no more than 4 microns.

Additionally, it has been surprisingly discovered that the presence of the polyfarnesene polymer in an electrodepositable coating composition results in little to no negative impact on the adhesion of a subsequently applied coating layer. Coatings formed from the electrodepositable coating composition of the present invention may have an adhesion rating of at least 7, such as at least 8, such as at least 9, as measured by the White Alkyd Adhesion Test described in the Examples below. The combination of reduced crater depth and good adhesion resulting from the use of the polyfarnesene polymer was an unexpected result.

Furthermore, improvement in edge coverage may also result from inclusion of the polyfarnesene polymer to an electrodepositable coating composition.

Multi-Layer Coating Composites

The electrodepositable coating compositions of the present invention may be utilized in an electrocoating layer that is part of a multi-layer coating composite comprising a substrate with various coating layers. The coating layers may include a pretreatment layer, such as a phosphate layer (e.g., zinc phosphate layer), an electrocoating layer which results from the aqueous resinous dispersion of the present invention, and suitable top coat layers (e.g., base coat, clear coat layer, pigmented monocoat, and color-plus-clear composite compositions). It is understood that suitable topcoat layers include any of those known in the art, and each independently may be waterborne, solventborne, in solid particulate form (i.e., a powder coating composition), or in the form of a powder slurry. The top coat typically includes a film-forming polymer, crosslinking material and, if a colored base coat or monocoat, one or more pigments. According to the present invention, the primer layer is disposed between the electrocoating layer and the base coat layer. According to the present invention, one or more of the topcoat layers are applied onto a substantially uncured underlying layer. For example, a clear coat layer may be applied onto at least a portion of a substantially uncured basecoat layer (wet-on-wet), and both layers may be simultaneously cured in a downstream process.

Moreover, the topcoat layers may be applied directly onto the electrodepositable coating layer. In other words, the substrate lacks a primer layer. For example, a basecoat layer may be applied directly onto at least a portion of the electrodepositable coating layer.

It will also be understood that the topcoat layers may be applied onto an underlying layer despite the fact that the underlying layer has not been fully cured. For example, a clearcoat layer may be applied onto a basecoat layer even though the basecoat layer has not been subjected to a curing step. Both layers may then be cured during a subsequent curing step thereby eliminating the need to cure the basecoat layer and the clearcoat layer separately.

According to the present invention, additional ingredients such as colorants and fillers may be present in the various coating compositions from which the topcoat layers result. Any suitable colorants and fillers may be used. For example, the colorant may be added to the coating in any suitable form, such as discrete particles, dispersions, solutions and/or flakes. A single colorant or a mixture of two or more colorants can be used in the coatings of the present invention. It should be noted that, in general, the colorant can be present in a layer of the multi-layer composite in any amount sufficient to impart the desired property, visual and/or color effect.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant may be organic or inorganic and may be agglomerated or non-agglomerated. Colorants may be incorporated into the coatings by grinding or simple mixing. Colorants may be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPP red BO"), titanium dioxide, carbon black, zinc oxide, antimony oxide, etc. and organic or inorganic UV opacifying pigments such as iron oxide, transparent red or yellow iron oxide, phthalocyanine blue and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

The colorant may be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions may include colorants such as pigments or dyes having a particle size of less than 150 nm, such as less than 70 nm, or less than 30 nm. Nanoparticles may be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions may also be produced by crystallization, precipitation, gas phase condensation, and chemical attrition (i.e., partial dissolution). In order to minimize re-agglomeration of nanoparticles within the coating, a dispersion of resin-coated nanoparticles may be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. patent application Ser. No. 10/876,031 filed Jun. 24, 2004, which is incorporated herein by reference, and U.S. Provisional Application No. 60/482,167 filed Jun. 24, 2003, which is also incorporated herein by reference.

According to the present invention, special effect compositions that may be used in one or more layers of the multi-layer coating composite include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions may provide other perceptible properties, such as reflectivity, opacity or texture. For example, special effect compositions may produce a color shift, such that the color of the coating changes when the coating is viewed at different angles. Example color effect compositions are identified in U.S. Pat. No. 6,894,086, incorporated herein by reference. Additional color effect compositions may include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

According to the present invention, a photosensitive composition and/or photochromic composition, which reversibly alters its color when exposed to one or more light sources, can be used in a number of layers in the multi-layer composite. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. For example, the photochromic and/or photosensitive composition may be colorless in a non-excited state and exhibit a color in an excited state. Full color-change may appear within milliseconds to several minutes, such as from 20 seconds to 60 seconds. Example photochromic and/or photosensitive compositions include photochromic dye.

According to the present invention, the photosensitive composition and/or photochromic composition may be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with the present invention, have minimal migration out of the coating. Example photosensitive compositions and/or photochromic compositions and methods for making them are identified in U.S. application Ser. No. 10/892,919 filed Jul. 16, 2004 and incorporated herein by reference.

As used herein, the term "polymer" encompasses, but is not limited to, oligomers and both homopolymers and copolymers.

As used herein, unless otherwise defined, the term "substantially free" means that the component is present, if at all, in an amount of less than 1% by weight, based on the total resin solids weight of the composition.

As used herein, unless otherwise defined, the term "essentially free" means that the component is present, if at all, in an amount of less than 0.1% by weight, based on the total resin solids weight of the composition.

As used herein, unless otherwise defined, the term completely free means that the component is not present in the slurry composition, i.e., 0.00% by weight, based on the total resin solids weight of the composition.

For purposes of the detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

As used herein, unless indicated otherwise, a plural term can encompass its singular counterpart and vice versa, unless indicated otherwise. For example, although reference is made herein to "a" polyfarnesene polymer, "an" ionic salt group-containing film-forming polymer, and "a" curing agent, a combination (i.e., a plurality) of these components can be used. In addition, in this application, the use of "or" means "and/or" unless specifically stated otherwise, even though "and/or" may be explicitly used in certain instances.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

As used herein, the terms "on," "onto," "applied on," "applied onto," "formed on," "deposited on," "deposited onto," mean formed, overlaid, deposited, or provided on but not necessarily in contact with the surface. For example, an electrodepositable coating composition "deposited onto" a substrate does not preclude the presence of one or more other intervening coating layers of the same or different composition located between the electrodepositable coating composition and the substrate.

As used herein, the term "polymer" refers broadly to prepolymers, oligomers and both homopolymers and copolymers. It should be noted that the prefix "poly" refers to two or more.

As used herein, "adduct" means a product of a direct addition of two or more distinct molecules, resulting in a single reaction product containing all atoms of all components.

As used herein, the terms "resin solids" or "resin blend solids" include the polyfarnesene polymer, curing agent, resin used in preparation of the film-forming polymer and/or pigment paste, and any additional water-dispersible non-pigmented component(s).

Whereas specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

In view of the foregoing, the present invention thus relates in particular, without being limited thereto, to the following aspects:

Aspect 1. An electrodepositable coating composition comprising:
a polyfarnesene polymer; and
an ionic salt group-containing film-forming polymer.

Aspect 2. The electrodepositable coating composition of Aspect 1, wherein the polyfarnesene polymer comprises the residue of trans-β-farnesene.

Aspect 3. The electrodepositable coating composition of Aspect 1, wherein the polyfarnesene polymer further comprises the residue of α-farnesene, cis-β-farnesene, or any combination thereof.

Aspect 4. The electrodepositable coating composition of any of the preceding Aspects, wherein the polyfarnesene polymer further comprises structural units obtained from butadiene, isoprene, styrene, a sesquiterpene, or any combination thereof.

Aspect 5. The electrodepositable coating composition of any of the preceding Aspects, wherein the polyfarnesene polymer has a number average molecular weight of 500 g/mol to 10,000 g/mol.

Aspect 6. The electrodepositable coating composition of any of the preceding Aspects, wherein the polyfarnesene polymer is present in the electrodepositable coating composition in an amount of 0.1% to 10% by weight based on the total weight of the resin blend solids.

Aspect 7. The electrodepositable coating composition of any of the preceding Aspects, wherein the polyfarnesene polymer is incorporated into the electrodepositable coating composition as a reaction product obtained from the reaction of the polyfarnesene polymer with a compound reactive with the polyfarnesene polymer.

Aspect 8. The electrodepositable coating composition of Aspect 7, wherein the polyfarnesene polymer comprises a functional group that is reacted with the compound to form the reaction product.

Aspect 9. The electrodepositable coating composition of any of the preceding Aspects, wherein the polyfarnesene polymer comprises a hydroxyl functional group, an amino functional group, a thiol functional group, an epoxide functional group, an amide functional group, a carbamate functional group, a carboxylic acid group, a phosphorous acid group, a sulfonic acid group, or any combination thereof.

Aspect 10. The electrodepositable coating composition of any of the preceding Aspects, wherein the polyfarnesene polymer comprises at least one hydroxyl functional group.

Aspect 11. The electrodepositable coating composition of Aspect 10, wherein polyfarnesene polymer has a theoretical hydroxyl group equivalent weight of 100 to 10,000 g/equivalent.

Aspect 12. The electrodepositable coating composition of any of Aspects 10 or 11, wherein polyfarnesene polymer has a hydroxyl weight of 0.1 to 2.0 meq/g.

Aspect 13. The electrodepositable coating composition of any of the preceding Aspects, further comprising a polybutadiene polyol, a polybutylene oxide polymer, a polyetheramine adduct, a polyamine-dialdehyde adduct, an epoxy microgel, an acrylic microgel, an acrylic polymer, or any combination thereof.

Aspect 14. The electrodepositable coating composition of any of the preceding Aspects, wherein the ionic salt group-containing film-forming polymer comprises functional groups and the electrodepositable coating composition further comprises a curing agent that is reactive with the functional groups of the ionic salt group-containing film-forming polymer.

Aspect 15. The electrodepositable coating composition of Aspect 14, wherein the curing agent comprises a blocked polyisocyanate.

Aspect 16. The electrodepositable coating composition of Aspect 15, wherein the blocked polyisocyanate is at least partially blocked with the polyfarnesene polymer as a blocking agent.

Aspect 17. The electrodepositable coating composition of Aspect 1, wherein the electrodepositable coating composition is substantially free of tin.

Aspect 18. A method of coating a substrate comprising electrophoretically applying a coating deposited from the electrodepositable coating composition of any of Aspects 1-17 to at least a portion of the substrate.

Aspect 19. A substrate coated with a coating deposited from the electrodepositable coating composition of any of Aspects 1-17.

Aspect 20. The substrate of Aspect 19, wherein a crater depth of the coating on the substrate as measured by CRATER DEPTH TEST METHOD is reduced by at least 10% compared to a comparative coating composition that does not include the polyfarnesene polyol.

Illustrating the invention are the following examples, which, however, are not to be considered as limiting the invention to their details. Unless otherwise indicated, all parts and percentages in the following examples, as well as throughout the specification, are by weight.

EXAMPLES

Example 1: Preparation of a Blocked Polyisocyanate Crosslinker for Electrodepositable Coating Compositions (Crosslinker I)

A blocked polyisocyanate crosslinker (Crosslinker I), suitable for use in electrodepositable coating resins, was prepared in the following manner. Components 2-5 listed in Table 1, below, were mixed in a flask set up for total reflux with stirring under nitrogen. The mixture was heated to a temperature of 35° C., and Component 1 was added dropwise so that the temperature increased due to the reaction exotherm and was maintained under 100° C. After the addition of Component 1 was complete, a temperature of 110° C. was established in the reaction mixture and the reaction mixture held at temperature until no residual isocyanate was detected by IR spectroscopy. Component 6 was then added and the reaction mixture was allowed to stir for 30 minutes and cooled to ambient temperature.

TABLE 1

| No. | Component | Parts-by-weight (grams) |
|---|---|---|
| 1 | Polymeric methylene diphenyl diisocyanate[1] | 1340.00 |
| 2 | Dibutyltin dilaurate | 2.61 |
| 3 | Methyl isobutyl ketone | 234.29 |
| 4 | Diethylene glycol monobutyl ether | 324.46 |
| 5 | Ethylene glycol monobutyl ether | 945.44 |
| 6 | Methyl isobutyl ketone | 88.60 |

[1]Rubinate M, available from Huntsman Corporation.

Example 2: Preparation of a Cationic, Amine-Functionalized, Polyepoxide-Based Resin Comprising Polyfarnesene Diol (Inventive Resin Dispersion A)

A cationic, amine-functionalized, polyepoxide-based polymeric resin, suitable for use in formulating electrodepositable coating compositions, was prepared in the following manner. Components 1-5 listed in Table 2, below, were mixed in a flask set up for total reflux with stirring under nitrogen. The mixture was heated to a temperature of 130° C. and allowed to exotherm (175° C. maximum). A temperature of 145° C. was established in the reaction mixture and the reaction mixture was then held for 2 hours. Component 6 was introduced while allowing the mixture to cool to 125° C. followed by the addition of Components 7 and 8. Components 9 and 10 were then added to the reaction mixture quickly and the reaction mixture was allowed to exotherm. A temperature of 122° C. was established and the reaction mixture held for 1 hour, resulting in Resin Synthesis Product A.

TABLE 2

| No. | Component | Parts-by-weight (grams) |
|---|---|---|
| | Resin Synthesis Stage | |
| 1 | Bisphenol A diglycidyl ether[1] | 553.21 |
| 2 | Bisphenol A | 238.88 |
| 3 | Bisphenol A - ethylene oxide adduct (1/6 molar ratio BPA/EtO) | 214.74 |
| 4 | Methyl isobutyl ketone (MIBK) | 20.55 |
| 5 | Ethyl triphenyl phosphonium iodide | 0.54 |
| 6 | Polyfarnesene diol[2] | 10.26 |
| 7 | Methyl isobutyl ketone | 74.89 |
| 8 | Crosslinker I[3] | 646.57 |
| 9 | Diethylene triamine - MIBK diketimine[4] | 51.31 |
| 10 | Methyl ethanol amine | 43.81 |
| | Resin Dispersion Stage | |
| 11 | Resin Synthesis Product A | 1669.28 |
| 12 | Sulfamic acid | 36.47 |
| 13 | Deionized water | 1073.91 |
| 14 | Gum rosin solution in butyl carbitol formal (30 wt %) | 14.86 |

TABLE 2-continued

| No. | Component | Parts-by-weight (grams) |
|---|---|---|
| 15 | Deionized water | 1250.19 |
| 16 | Deionized water | 1100.00 |

[1]EPON 828, available from Hexion Corporation.
[2]Krasol F-3000 available from Cray Valley
[3]See Example 1, above.
[4]72.7% by weight (in MIBK) of the diketimine reaction product of 1 equivalent of diethylene triamine and 2 equivalents of MIBK.

A portion of the Resin Synthesis Product A (Component 11) was then poured into a pre-mixed solution of Components 12 and 13 to form a resin dispersion. Component 14 was then added quickly and the resin dispersion was stirred for 1 hour. Component 15 was then introduced over 30 minutes to further dilute the resin dispersion, followed by the addition of Component 16. The free MIBK in the resin dispersion was removed from the dispersion under vacuum at a temperature of 60-70° C.

The solids content of the resulting cationic, amine-functionalized, polyepoxide-based polymeric resin dispersion, comprising polyfarnesene diol added during the resin synthesis stage (Inventive Resin Dispersion A), was determined by adding a quantity of the resin dispersion to a tared aluminum dish, recording the initial weight of the resin dispersion, heating the resin dispersion in the dish for 60 minutes at 110° C. in an oven, allowing the dish to cool to ambient temperature, reweighing the dish to determine the amount of non-volatile content remaining, and calculating the solids content by dividing the weight of the remaining non-volatile content by the initial resin dispersion weight and multiplying by 100. (Note, this procedure was used to determine the solids content in each of resin dispersion examples described below). The Inventive Resin Dispersion A had a solids content of 38.58% by weight.

Example 3: Preparation of a Cationic, Amine-Functionalized, Polyepoxide-Based Resin Without Polyfarnesene Diol (Comparative Resin Dispersion B)

A cationic, amine-functionalized, polyepoxide-based polymeric resin, suitable for use in formulating electrodepositable coating compositions, was prepared in the following manner. Components 1-5 listed in Table 4, below, were mixed in a flask set up for total reflux with stirring under nitrogen. The mixture was heated to a temperature of 130° C. and allowed to exotherm (175° C. maximum). A temperature of 145° C. was established in the reaction mixture and the reaction mixture was then held for 2 hours. Component 6 was introduced while allowing the mixture to cool to 125° C. followed by the addition of Components 7 and 8. Components 9 and 10 were then added to the reaction mixture quickly and the reaction mixture was allowed to exotherm. A temperature of 122° C. was established and the reaction mixture held for 1 hour, resulting in Resin Synthesis Product C.

TABLE 3

| No. | Component | Parts-by-weight (grams) |
|---|---|---|
| | Resin Synthesis Stage | |
| 1 | Bisphenol A diglycidyl ether [1] | 583.94 |
| 2 | Bisphenol A | 252.15 |
| 3 | Bisphenol A - ethylene oxide adduct (1/6 molar ratio BPA/EtO) | 118.75 |
| 4 | Methyl isobutyl ketone (MIBK) | 29.53 |
| 5 | Ethyl triphenyl phosphonium iodide | 0.57 |
| 6 | Bisphenol A - ethylene oxide adduct (1/6 molar ratio BPA/EtO) | 118.75 |
| 7 | Methyl isobutyl ketone | 116.25 |
| 8 | Crosslinker I [2] | 683.69 |
| 9 | Diethylene triamine - MIBK diketimine [3] | 54.16 |
| 10 | Methyl ethanol amine | 46.24 |
| | Resin Dispersion Stage | |
| 11 | Resin Synthesis Product C | 1803.63 |
| 12 | Sulfamic acid | 38.50 |
| 13 | Deionized water | 1093.72 |
| 14 | Gum rosin solution in butyl carbitol formal (30 wt %) | 15.69 |
| 15 | Deionized water | 1320.42 |
| 16 | Deionized water | 1100.00 |

[1] EPON 828, available from Hexion Corporation.
[2] See Example 1, above.
[3] 72.7% by weight (in MIBK) of the diketimine reaction product of 1 equivalent of diethylene triamine and 2 equivalents of MIBK.

A portion of the Resin Synthesis Product C (Component 11) was then poured into a pre-mixed solution of Components 12 and 13 to form a resin dispersion. Component 14 was then added quickly and the resin dispersion was stirred for 1 hour. Component 15 was then introduced over 30 minutes to further dilute the resin dispersion, followed by the addition of Component 16. The free MIBK in the resin dispersion was removed from the dispersion under vacuum at a temperature of 60-70° C.

The solids content of the resulting cationic, amine-functionalized, resin dispersion was determined as described above in Example 2. The Comparative Resin Dispersion C had a solids content of 38.75% by weight.

Example 4: Preparation of Electrodepositable Coating Compositions

TABLE 4

| # | Material | Electrodepositable Coatings Composition - Amount (g) | |
|---|---|---|---|
| | | A | B |
| 1 | Resin Dispersion B | 1278.4 | — |
| | Resin Dispersion A | — | 1414.5 |
| 2 | Cationic Resin[1] | 158.8 | 158.8 |
| 3 | Butyl Carbitol Formal[2] | 6.5 | 6.5 |
| 4 | Methoxy propanol | 9.0 | 9.0 |
| 5 | Cationic Resin[3] | 144.4 | 144.4 |
| 6 | Pigment Paste[3] | 248.7 | 248.7 |
| 7 | DI Water | 1954.2 | 1818.1 |

[1] Described in US8884059B2, example 11
[2] Available as Mazon 1651 from BASF Corporation
[3] Described in US8884059B2, example 7
[4] Pigment Paste E6436Z available from PPG Industries, Inc.

For each paint composition, Charges 1-5 were added sequentially into a plastic container at room temperature under agitation with 10 minutes of stirring after each addition. The mixture was stirred for at least 30 minutes at room temperature. Charge 6 was then added, and the paint was allowed to stir until uniform, a minimum of 30 minutes. Charge 7 was added, and the paint was allowed to stir for a minimum of 30 minutes until uniform. The resulting cationic electrodepositable paint compositions had a solids content of 20.5%, determined as by described previously, and a pigment to binder ratio of 0.12/1.0 by weight.

After 25% ultrafiltration (and reconstitution with deionized water), coated panels were prepared from baths separately containing the cationic electrodepositable paint compositions and were evaluated for oil spot resistance. The results are reported below.

Oil Spot Contamination Resistance Testing

The above described electrodepositable paint compositions were then electrodeposited onto cold rolled steel test panels, 4×6×0.031 inches, pretreated with CHEMFOS C700/DI (CHEMFOS C700 is a zinc phosphate immersion pretreatment composition available from PPG Industries, Inc.). These panels are available from ACT Laboratories of Hillside, Mich. The panels were electrocoated in a manner well-known in the art by immersing them into a stirring bath at 32° C. and connecting the cathode of a direct current rectifier to the panel and connecting the rectifier's anode to stainless steel tubing used to circulate cooling water for bath temperature control. The voltage was increased from 0 to a set point voltage of 160V over a period of 30 seconds and then held at that voltage for an additional 120 seconds. This combination of time, temperature and voltage provided a cured dry film thickness of 20 microns for all paints.

After electrodeposition, the panels were removed from the bath and rinsed vigorously with a spray of deionized water and cured by baking for 25 minutes at 177° C. in an electric oven.

The substrate panels comprising the electrodeposited coating layers were tested for oil spot contamination resistance, which evaluates the ability of an electrodeposited coating to resist crater formation upon cure. The electrodeposited coating layers were tested for oil spot crater resistance by localized contamination of the dried coating layers using three common oils: Ferrocote 6130 (Quaker Chemical Corporation, F), LubeCon Series 0 Lubricant (Castrol Industrial North America Inc., L) or Molub-Alloy Chain Oil 22 Spray (Castrol Industrial North America Inc., M). The oil was deposited as a droplet (<0.1 µL) onto the dried coating layers using a 40% by weight solution of the LubeCon Series O Lubricant in isopropanol, a 40% by weight solution of the or Molub-Alloy Chain Oil 22 Spray in isopropanol, or a 40% by weight solution of Ferrocote 6130 in isopropanol/butanol (75%/25% by weight) and a micropipette (Scilogex). The oil-spotted substrate panels were then cured as described above (baked for 20 minutes at 177 ° C. in an electric oven).

Each substrate panel was scanned using a Mitutoyo SJ-402 stylus profilometer to examine the depth of crater defects in the cured coating layer. The scan length, rate, sampling interval, and tip diameter were 48 mm, 1 mm/s, 5 µm, and 5 µm, respectively. The differences between the highest peak and lowest pit points of each of the resulting craters in each coating layer (crater depth, Δ) were averaged (at least 4 craters per coating layer) to quantify the results of the oil spot test. This test is referred to herein as the CRATER DEPTH TEST METHOD. The results are summarized in Table 5, below.

TABLE 5

| Coatings | | Oil Spot Resistance Crater Size (Δ, μm) | | |
|---|---|---|---|---|
| Composition | Additive | L | F | M |
| A | None | 14 | 11 | 8 |
| B | Polyfarnesene Diol | 6 | 7 | 4 |

Adhesion Testing

White alkyd adhesion testing evaluates the ability of a second cured coating layer to adhere to the underlying cured electrodeposited coating. White alkyd paint, C354-W404, available from PPG Industries, Inc., was reduced to a viscosity of 100 centipoise as measured at 20 rpm by a Brookfield DV-I Prime viscometer fitted with a cone and plate accessory. The reducing solvent was butyl acetate. E-coated test panels were prepared as described and baked in an electric oven at 155° C. for 25 minutes. A wet white alkyd coating was applied to the cured e-coat using a #55 (0.055-inch diameter wire) wire-wound coating rod, available from R. D. Specialties. After allowing the white alkyd coating to flash for 10 minutes under ambient conditions, the panels were cured by baking horizontally for 30 minutes at 150° C. in an electric oven. After the panels had cooled to ambient temperature (about 25° C.), they were subjected to a crosshatch test.

The crosshatch test uses a scribing tool with teeth set 2 mm apart which cut the coating system down to metallic substrate. With two such perpendicular cuts, a "cross-hatch" results which is then tested with Scotch 898 tape. Failure constitutes loss of adhesion between the alkyd coating and the electrodeposited coating. Crosshatch adhesion results were tested on a scale of 0 to 10, with 0 being the worst and 10 being the best and are reported in the following table. A score of 0 indicates that the cured alkyd paint has been completely removed by the tape from within the scribed area. A score between 0 and 10 indicates that progressively less cured alkyd paint is removed by the tape from within the scribed area, paint being typically removed from the corners where two scribed lines intersect. A score of 10 indicates that there is no evidence of cured alkyd paint being removed by the tape from any of the corners where two scribed lines intersect. As used herein, this test is referred to as the "White Alkyd Adhesion Test."

TABLE 6

| Coating Composition | Adhesion Testing Results Additive | While Alkyd Adhesion Test |
|---|---|---|
| A | None | 10 |
| B | Polyfarnesene Diol | 9 |

These results indicate that the inclusion of polyfarnesene diol in coating compositions results in a cured coating having improved crater control without loss of adhesion between a subsequently applied alkyd coating over the electrodeposited coating.

It will be appreciated by skilled artisans that numerous modifications and variations are possible in light of the above disclosure without departing from the broad inventive concepts described and exemplified herein. Accordingly, it is therefore to be understood that the foregoing disclosure is merely illustrative of various exemplary aspects of this application and that numerous modifications and variations can be readily made by skilled artisans which are within the spirit and scope of this application and the accompanying claims.

We claim:

1. An electrodepositable coating composition comprising:
   a polyfarnesene polymer; and
   an ionic salt group-containing film-forming polymer.

2. The electrodepositable coating composition of claim 1, wherein the polyfarnesene polymer comprises the residue of trans-β-farnesene.

3. The electrodepositable coating composition of claim 1, wherein the polyfarnesene polymer further comprises the residue of α-farnesene, cis-β-farnesene, or any combination thereof.

4. The electrodepositable coating composition of claim 1, wherein the polyfarnesene polymer further comprises the residue of butadiene, isoprene, styrene, a sesquiterpene, or any combination thereof.

5. The electrodepositable coating composition of claim 1, wherein the polyfarnesene polymer has a number average molecular weight of 500 g/mol to 10,000 g/mol.

6. The electrodepositable coating composition of claim 1, wherein the polyfarnesene polymer is present in the electrodepositable coating composition in an amount of 0.1% to 10% by weight based on the total weight of the resin blend solids.

7. The electrodepositable coating composition of claim 1, the polyfarnesene polymer is incorporated into the electrodepositable coating composition as a reaction product comprising the residue of the polyfarnesene polymer.

8. The electrodepositable coating composition of claim 7, wherein the polyfarnesene polymer comprises a functional group that is reacted with a compound to form the reaction product.

9. The electrodepositable coating composition of claim 1, wherein the polyfarnesene polymer comprises an amino functional group, a thiol functional group, an epoxide functional group, an amide functional group, a carbamate functional group, a carboxylic acid group, a phosphorous acid group, a sulfonic acid group, or any combination thereof.

10. The electrodepositable coating composition of claim 1, wherein the polyfarnesene polymer comprises at least one hydroxyl functional group.

11. The electrodepositable coating composition of claim 10, wherein the polyfarnesene polymer has a theoretical hydroxyl group equivalent weight of 100 to 10,000 g/equivalent.

12. The electrodepositable coating composition of claim 10, wherein the polyfarnesene polymer has a hydroxyl weight of 0.1 to 2.0 meq/g.

13. The electrodepositable coating composition of claim 1, further comprising a polybutadiene polyol, a polybutylene oxide polymer, a polyetheramine adduct, a polyamine-dialdehyde adduct, an epoxy microgel, an acrylic microgel, an acrylic polymer, or any combination thereof.

14. The electrodepositable coating composition of claim 1, wherein the ionic salt group-containing film-forming polymer comprises functional groups and the electrodepositable coating composition further comprises a curing agent that is reactive with the functional groups of the film-forming polymer.

15. The electrodepositable coating composition of claim 14, wherein the curing agent comprises a blocked polyisocyanate.

16. The electrodepositable coating composition of claim 15, wherein the blocked polyisocyanate is at least partially blocked with the polyfarnesene polymer as a blocking agent.

17. The electrodepositable coating composition of claim 1, wherein the electrodepositable coating composition is substantially free of tin.

18. A method of coating a substrate comprising electrophoretically applying a coating deposited from the electrodepositable coating composition of claim 1 to at least a portion of the substrate.

\* \* \* \* \*